J. BUCKLEY.
METHOD OF SEPARATING FRUIT FROM LEAVES.
APPLICATION FILED OCT. 3, 1921.

1,415,985. Patented May 16, 1922.

INVENTOR.
Jerry Buckley
BY
ATTORNEY

UNITED STATES PATENT OFFICE.

JERRY BUCKLEY, OF MILLS, CALIFORNIA.

METHOD OF SEPARATING FRUIT FROM LEAVES.

1,415,985.　　　Specification of Letters Patent.　Patented May 16, 1922.

Application filed October 3, 1921. Serial No. 505,011.

*To all whom it may concern:*

Be it known that I, JERRY BUCKLEY, a citizen of the United States, residing at Mills, county of Sacramento, State of California, have invented certain new and useful Improvements in Methods of Separating Fruit from Leaves; and I do declare the following to be a full, clear, and exact description of the same, reference being had to the accompanying drawings, and to the characters of reference marked thereon, which form a part of this application.

This invention relates to improvements in methods of cleaning fruit, and especially prunes and the like, the principal object of the invention being to provide a water-immersion method and a device for carrying out this method, by means of which the fruit, after it is picked off the ground or shaken off the trees, may be readily and quickly separated from the leaves and twigs which are bound to be mixed therewith, and will at the same time be washed to remove all dirt and dust therefrom.

Another object of my invention is to provide means for readily removing the leaves, etc., as they collect after being once separated from the fruit, so that the separation may be carried on continuously without the chance of the quantity of the leaves assuming such proportions that the fruit cleaning is interfered with.

A further object is to provide for the positive separation from the fruit of foreign and non-floatable matter smaller in size than the fruit, and which may be mixed therewith. I have also provided means for removing any accumulation of such heavy foreign matter at will.

I have also provided a device for the purpose which will not harm nor bruise the fruit being treated in any way, and whose operation may be maintained continuously for as long a period as may be desired without any stops being necessary.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Figure 1:
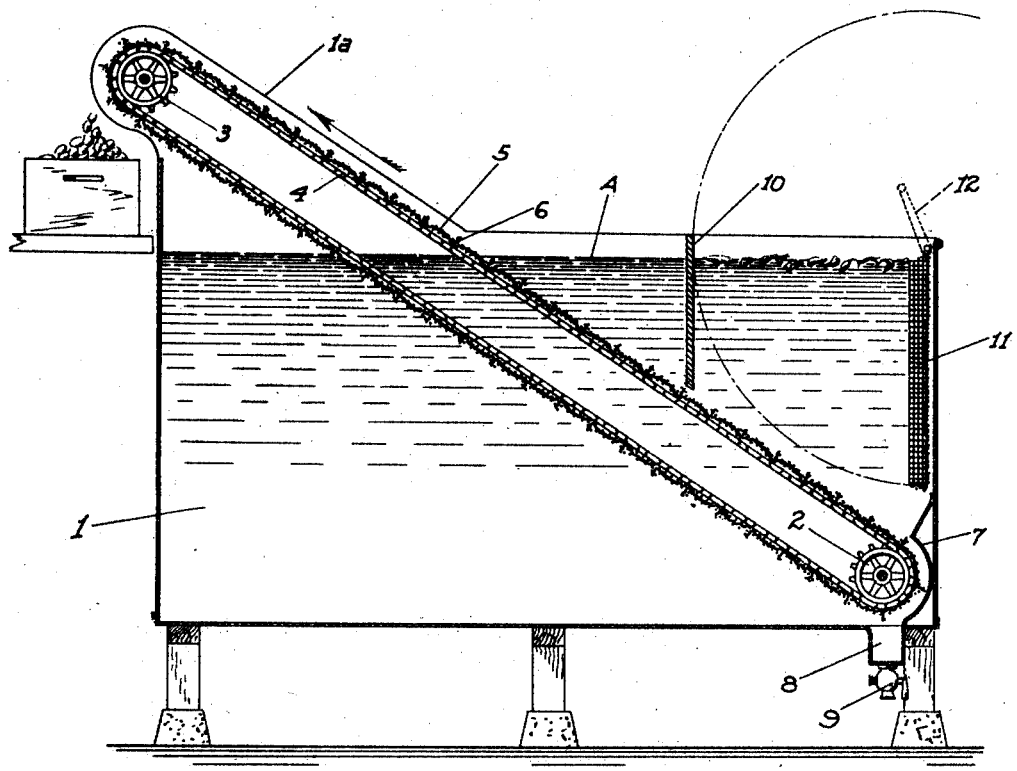
Fig. 1 is a longitudinal section of the device used in connection with my method.
Figure 2:
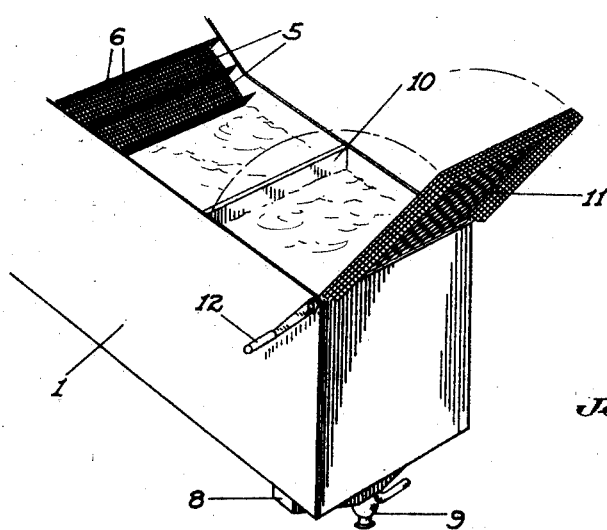
Fig. 2 is a fragmentary perspective elevation of one end of the same.

Referring now more particularly to the characters of reference on the drawings, the numeral 1 denotes a water tank, open on top and preferably rectangular.

Journaled in the bottom of the tank at one end thereof and on each side are sprockets 2, while journaled in transverse alinement therewith but at the other end thereof and at a certain distance above the normal top of the tank are similar sprockets 3.

Passing over these sprockets are endless chains 4, between which extend transverse strips 5 of screening or freely perforated material of any suitable character. The strips are laid in continuous alinement so as to form a complete flooring, each strip extending the length of several links of the chain, being connected to only one of these, and being bent to a curvature equal to that of the sprockets so as to pass freely around the latter without buckle or tensional strain.

One transverse end of each strip is bent up for the entire extent thereof and substantially at right angles thereto to form what amount to cleats or flanges 6. An endless conveyor belt is thus provided, the upper surface of which is adapted to travel from the lower toward the upper end, and is to receive the fruit thereon, which is caught and prevented from rolling down by the cross members 6.

Fixed in the tank at the lower end thereof in which the sprockets 2 are located is a baffle plate 7, which extends the full width of the tank and is curved concentric with the sprockets and adjacent the outer edges of the members 6.

Under the tank and to which the baffle 7 leads is a sump 8, to which is connected a draw-off valve 9 of any suitable type.

Positioned transversely in the tank is a wall or partition 10, which is positioned intermediate the lower-sprocket end of the tank and the point where the conveyor raises above the water level A, this wall extending vertically down from above the water level to a point just sufficient to allow the conveyor belt to pass thereunder.

Pivoted or hinged at the top of the tank at said lower sprocket end and extending transversely thereof is a screen gate 11, which normally hangs down alongside the inner surface of the end wall of the tank, and which has an extent equal to the distance between this end wall and the partition 10.

A crank handle member 12 is provided by which the gate may be raised and upset.

In order that the fruit cannot spill off the conveyor when the latter emerges from the water and proceeds above the normal top of the tank, the sides of the latter are extended upwardly where necessary, as at 1ª, these extensions sloping up parallel to the conveyor and just above the outer edges of the member 6.

In operation, the tank is filled with water, and the conveyor turned by any suitable power means in the direction indicated by the arrow.

The uncleaned fruit is then dumped into the tank between the partition and the adjacent end. The water through which the fruit passes causes the floatable matter mixed therewith, such as leaves, twigs etc. to be separated from the heavier fruit and float on the surface, the fruit coming to rest on the conveyor, to be withdrawn from the tank thereby at the opposite end.

At the same time, the fruit will not strike heavily enough on the conveyor to hurt or bruise the fruit in any way, owing to the buoyant or cushioning effect of the water. As the fruit is drawn through the water while resting on the conveyor, any dust and dirt on the surface thereof is of course washed off, so that when the fruit drops from the upper end of the conveyor it is cleaned and drained, and ready to be emptied directly into a standard dipper (if the fruit be prunes and the like) or other receptacles.

The partition 10 of course serves to keep the leaves, etc., confined within a certain area and positively prevents any of them floating along to the point where the conveyor leaves the water and clinging to the conveyor. Any pits, stones, etc., which may also be mixed with the fruit if it is gathered off the ground will of course sink, and passing through the perforated conveyor, will be deposited in the sump 8, to be withdrawn at any time by opening the valve 9, by means of which the tank itself may be emptied when the water is stale or to clean the tank.

When the accumulation of leaves on the surface of the water becomes too great, the gate 11 is raised, catching all the stuff floating on the water and raising the same therefrom. By then turning the gate further so that it tips over the end of the tank, the leaves, etc., gathered thereby will of course be dumped outside the tank, when the gate may be returned to its original and normal position in the tank, as shown in Fig. 1, out of the way of further fruit dumping operations and ready to engage another accumulation of leaves when necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A method of separating fruit from floatable foreign matter consisting of submerging the fruit in a liquid, whereby the floatable matter will remain on the surface of the liquid and providing means for continuously removing the fruit from under the liquid for preventing the floating matter from again coming in contact with the fruit as the latter is withdrawn from the liquid, and for removing an accumulation of such floating matter at will and with a single operation.

2. An apparatus for the purpose described comprising an open liquid filled tank, a sloping conveyor therein submerged at one end and above the liquid level at the other, a partition in said tank positioned transversely of the conveyor and extending from above the liquid level to the conveyor at a point where the latter is still submerged, the fruit being dumped into the tank between the partition and the adjacent end of the tank, whereby any floatable matter mixed with the fruit will rise to the surface of the liquid in the restricted area bounded by the tank walls and the partition, and means mounted in the tank in said area for removing any accumulation of floatable matter with one operation and at will.

3. An apparatus for the purpose described comprising an open liquid filled tank, a sloping conveyor therein submerged at one end and above the liquid level at the other, a partition in said tank positioned transversely of the conveyor and extending from above the liquid level to the conveyor at a point where the latter is still submerged, the fruit being dumped into the tank between the partition and the adjacent end of the tank, whereby any floatable matter mixed with the fruit will rise to the surface of the liquid in the restricted area bounded by the tank walls and the partition, a perforated gate whose area is substantially equal to that of the restricted area hinged along the upper edge of the tank and normally lying inside of the tank alongside one wall, and means whereby said gate may be turned to sweep it through and above the liquid.

4. An apparatus for the purpose described comprising a tank adapted to be filled with a liquid, and a conveyor mounted therein and sloping upwardly from under the liquid to a point thereabove, said conveyor comprising endless flexible members, a plurality of screen members extending transversely of the flexible members and fixed thereto, being arranged to form a continuous flooring fitting closely between the sides of the tank, and cleats projecting outwardly of the screening at intervals in the length thereof and transversely of the flexible members and tank.

5. An apparatus for the purpose described comprising a tank adapted to be filled with a liquid, and a conveyor mounted therein and sloping upwardly from under the liquid, adjacent one end of the tank; including an endless perforated belt structure; and a baffle in the tank extending transversely of the belt and overhanging the lower end of the latter and terminating closely thereagainst, the fruit being dumped into the tank at this end.

6. An apparatus for the purpose described comprising a tank adapted to be filled with a liquid, a conveyor mounted therein and sloping upwardly from under the liquid to a point thereabove, a transverse and substantially vertical partition in the tank extending from the conveyor to a point above the liquid, and a screen basket hinged to the end of the tank, the area of said screen being substantially that of the area enclosed by the walls of the tank and the partition.

7. An apparatus for the purpose described comprising a tank adapted to be filled with a liquid, a conveyor mounted therein and sloping upwardly from under the liquid to a point thereabove, and a screen basket hinged to the tank and adapted to be swept through the liquid above the conveyor and to be swung to tip backwards to dump outside the tank.

In testimony whereof I affix my signature.

JERRY BUCKLEY.